(12) United States Patent
Jiang (10) Patent No.: US 7,400,680 B2
(45) Date of Patent: Jul. 15, 2008

(54) RECTANGULAR-SHAPE MOTION SEARCH

(75) Inventor: Hong Jiang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 10/676,577

(22) Filed: Sep. 30, 2003

(65) Prior Publication Data

US 2005/0069037 A1 Mar. 31, 2005

(51) Int. Cl.
*H04N 7/12* (2006.01)
(52) U.S. Cl. ............. 375/240.16; 375/240; 375/240.01; 375/240.12
(58) Field of Classification Search ................ 375/240, 375/240.01, 240.12, 240.16
See application file for complete search history.

(56) References Cited

U.S. PATENT DOCUMENTS 6,122,317 A * 9/2000 Hanami et al. ......... 375/240.16

OTHER PUBLICATIONS

Zhu et al, A New Diamond Search Algorithm for Fast Block-Matching Motion Estimation, IEEE Transactions on Image Processing, vol. 9, No. 2, Feb. 2000, 4 pages (p. 287-290).*
Alexis M. Tourapis, Oscar C. Au, Ming L. Liou, "Predictive Motion Vector Field Adaptive Search Technique (PMVFAST)—Enhancing Block Based Motion Estimation", Department of Electrical and Electronic Engineering, The Hong Kong University of Science and Technology, Clear Water Bay, Kowloon, Hong Kong, Jan. 2001.
Zhu, S, et al., "A New Diamond Search Algorithm For Fast Block-Matching Motion Estimation", IEEE Transactions On Image Processing, IEEE Inc., New York, US, vol. 9, No. 2, Feb. 2000, pp. 287-290, XP000912591, ISSN: 1057-7149.
First Office Action for Chinese Application No. 200410078090.2, issued Jul. 7, 2006, 12 pages, The Patent Office of the People's Republic of China.
International Preliminary Report on Patentability and Written Opinion of the International Searching Authority mailed Apr. 13, 2006 for application No. PCT/US2004/032467, 9 pages.
Korean Foreign Office Action mailed May 30, 2007 and english translation. 4 pages.
Chinese Foreign Office Action mailed Aug. 1, 2006 and english translation. 14 pages.
Zho and Ma, A new diamond search algorithm for fast block-matching motion estimation. IEEE Transaction on Image Processing. vol. 9, No. 2. Feb. 2000. 4 pages.

* cited by examiner

*Primary Examiner*—Allen Wong
(74) *Attorney, Agent, or Firm*—Blakely, Sokoloff, Taylor & Zafman LLP (57) ABSTRACT

A method for rectangular-shape motion search has been disclosed. One embodiment of the method includes performing motion measurement on a plurality of motion search points, the plurality of motion search points forming a rectangular search region, finding a minimal motion search point among the plurality of motion search points substantially based on result of the motion measurement, and finding a motion vector corresponding to the relative movement of the pixel block from the first video frame to the second video frame if the minimal motion search point is within an inner region of the rectangular search region.

19 Claims, 8 Drawing Sheets

RECTANGULAR-SHAPE MOTION SEARCH

FIELD OF INVENTION

The present invention relates to video and graphics signal processing, and more particularly, to performing a motion search within a video frame.

BACKGROUND

Video data compression removes redundant data that can be easily restored to reduce storage space or transmission bandwidth. Typically, video data is in a series of frames in which much of the image is substantially similar as objects in the video frames move in the field. By tracking the moving objects, the amount of data recorded can be reduced to the changes in the objects from one frame to another while the rest of the data can be substituted with data recorded for a previous frame.

Figure 1A:
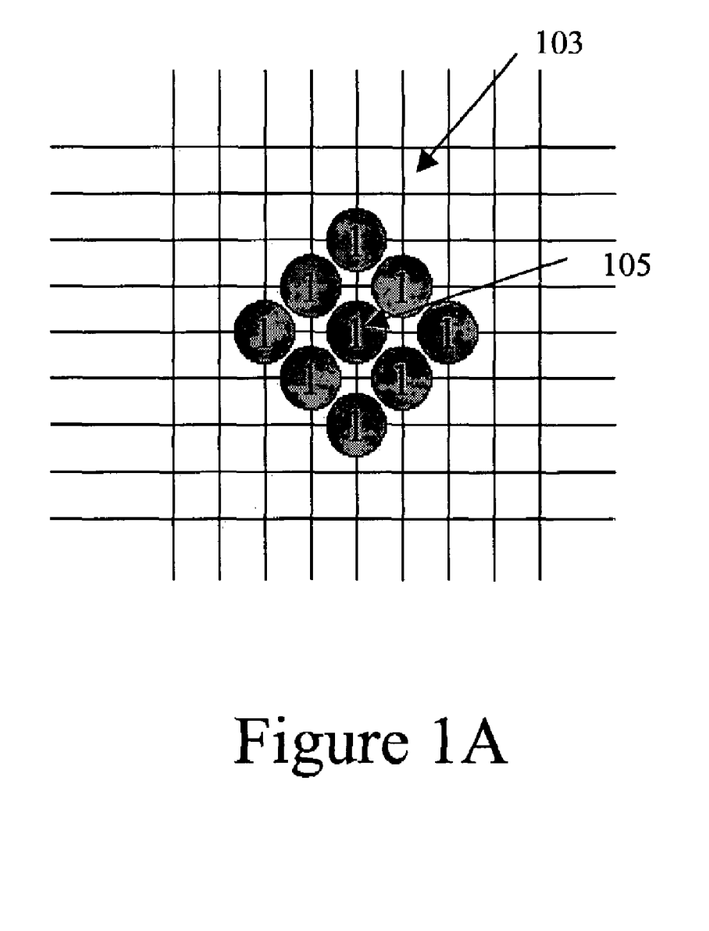
FIG. 1A shows the motion search points on the first level of a diamond search.
Figure 1B:
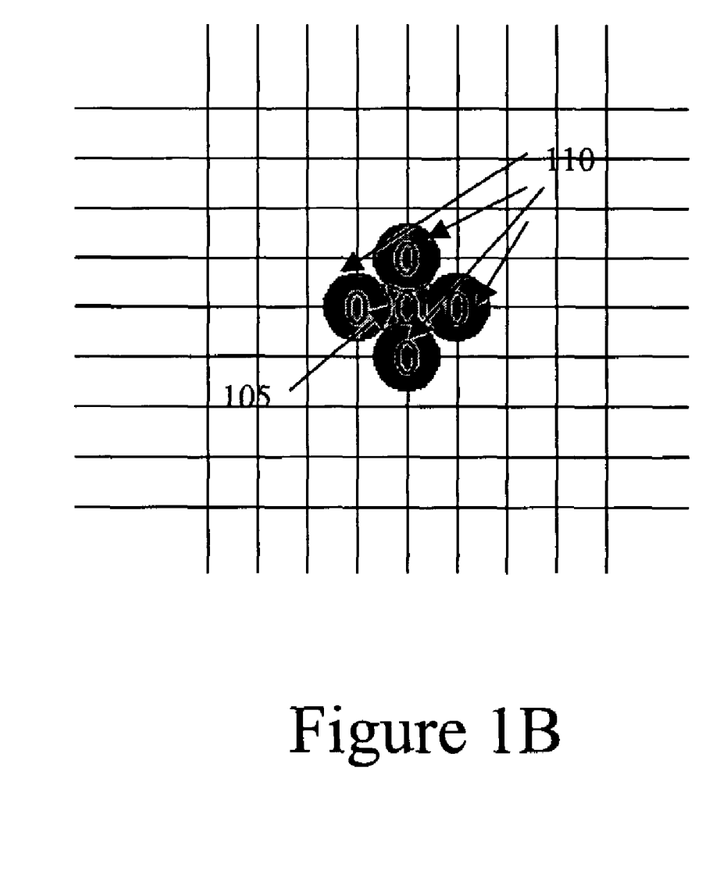
FIG. 1B shows the motion search points on the second level of the diamond search.

An existing gradient-descent method to estimate how a block of pixels in a video frame will move in a subsequent frame is commonly referred to as full pixel diamond search. A full-pixel diamond search performs a motion search using two levels as shown in FIGS. 1A and 1B. Referring to FIG. 1A, measurements of the pixels are collected at the 9 search points 103 within a diamond search pattern in the first level of the motion search. The measurements at the motion search points are compared with each other to determine how close each search point of a block of pixels in a reference frame is to the block of pixels in the current frame. The reference frame may be a prior frame in the video data. If the closest point is one of the eight outer points within the diamond search pattern, the search pattern is shifted to a new position centered at that point. In such a case, the new search pattern has 4 search points in common with the old search pattern and 5 new search points. Therefore, 5 new measurements are performed when the diamond search pattern is shifted to the right by 2 grid lines. No measurement is necessary for the search points common to both search patterns because the data from previous measurements can be reused.

If the best measurement is at the center point, the next level search is performed as shown in FIG. 1B. At this level, four new motion search points 110 are measured and the data of the point 105 at the center from previous measurements is reused. The motion search point with the smallest measurement is the full-pixel search position.

The diamond search is a fast algorithm because only 5 or more measurements are required for shifting the pattern by 2 grids. However, the irregular shape of the diamond search pattern complicates operations on the measurement data stored in a register file. Some of the problems of the diamond search include the difficulties in keeping track of the address offsets of the data, the inefficient usage of storage space, and possible miss of true minima due to its sparse sampling pattern.

Due to its massive amount of computation requirement, motion search is usually performed by a parallel processor. One such parallel processor uses operations of Single Instruction Multiple Data (SIMD). For example, one measurement of motion search is the Sum of Absolute Different (SAD), a measure of the L1-norm of the difference between the block in the current frame and a block in the reference frame. Another measurement of motion search is the Sum of Square Different (SSD), a measure of the square of L2-norm (Euclidean norm) of the difference between the block in the current frame and a block in the reference frame. The SAD or SSD measurement on multiple data entries may be performed by a SIMD operation. A typical parallel processor has a large register file in order to reduce the number of data access to the memory hierarchy. Data of the diamond search within a search region is usually stored in the register file. The parallel processor may access multiple data entries in the register file in a parallel operation, such as, for example, a SAD operation to compute the sums of absolute difference of data entries in several consecutive columns. Since the rows in the diamond shaped region in the register file have different numbers of columns, different numbers of columns are accessed to compute the SAD of entries in the rows. Consequently, the parallel processor has to keep track of different address offsets for various rows and columns, and thus, complicating the performance of parallel operations.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

DETAILED DESCRIPTION

A method for rectangular-shaped motion search is disclosed. One embodiment of a method for performing a rectangular-shaped block motion search includes performing motion measurement on a number motion search points in a rectangular search region, finding a minimal motion search point among the motion search points according to the result of the motion measurement, and converging the rectangular search region at the minimal motion search point to find a motion vector representing the relative movement of the pixel block from a first video frame to a second video frame if the minimal motion search point is within an inner region of the rectangular search region.

In the following description, numerous specific details are set forth. However, it is understood that embodiments of the invention may be practiced without these specific details. In other instances, well-known modules, structures, and techniques have not been shown in detail in order not to obscure the understanding of this description.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The operations and displays presented herein are not inherently related to any particular computer or other apparatus. Various general-purpose systems may be used with programs in accordance with the teachings herein, or it may prove convenient to construct more specialized apparatus to perform the operations. The required structure for a variety of these systems will appear from the description below. In addition, the present invention is not described with reference to any particular programming language. It will be appreciated that a variety of programming languages may be used to implement the teachings of the invention as described herein.

Figure 2:
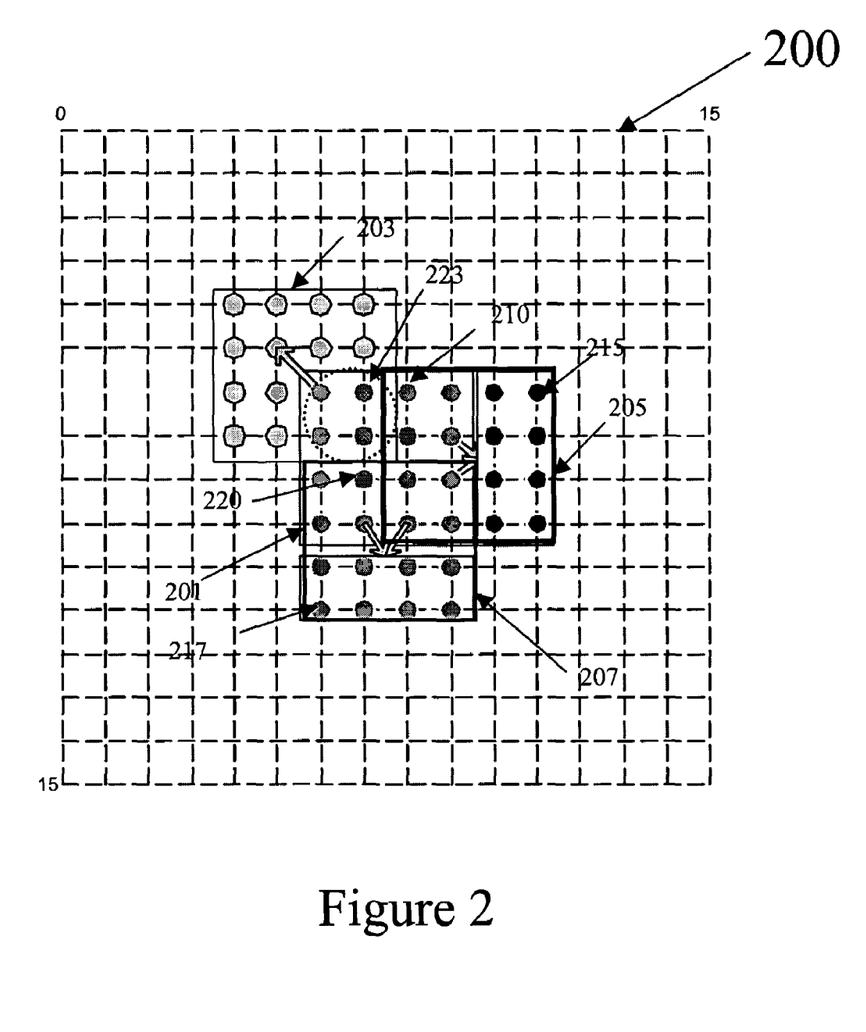
FIG. 2 shows one embodiment of a search region.

In one embodiment, a rectangular search pattern is used to define a search region to determine the relative movement of a pixel block from one video frame to another video frame. The video frame may include multiple pixel blocks. FIG. 2 shows one embodiment of a search region in a reference window 200. Referring to FIG. 2, the reference window 200 is a 16×16 grid. The search region 201 is a 4×4 square with 16 motion search points inside the region. It is well known that a square is a type of rectangle with equilateral sides. One should appreciate that the 4×4 square is used here for the purpose of illustration. It should be apparent that rectangular search regions of different dimensions can be used in other embodiments, such as, for example, 4×8, 16×8, 16×16, etc. Referring to FIG. 2, the search region has 4 inner search points, e.g., point 220, and 12 search points along the edges of the square region 201, e.g., point 210. The 12 search points are referred to as the outer points in contrast to the 4 inner points. In one embodiment, each of the inner points and outer points corresponds to a pixel block in the reference frame.

In one embodiment, measurements of one or more pixel attributes are taken at each motion search point in the search region 201 to find a pixel block in the current video frame that matches another pixel block in a reference video frame. The attributes may include pixel intensity, pixel color, etc. In one embodiment, the measurement of a pixel block at each search point is compared to a pixel block in the reference video frame based on a predetermined criterion. In one embodiment, the sum of the absolute difference (SAD) in pixel intensity between the pixels in the pixel blocks in two frames is computed. In one embodiment, the search point with the minimal SAD, also referred to as the minimal point, is selected.

In one embodiment, the search is performed to find the relative movement of a pixel block from the reference video frame to the current video frame. When the minimal point is one of the inner points in the square search region, the block centered at the minimal point in the reference frame is the closest match of the pixel block in the current frame. Once the closest match of the pixel block in the reference frame is found, a motion vector representing the relative movement of the pixel block from the reference frame to the current frame can be determined.

In one embodiment, video data having a set of video frames is compressed by storing the first frame as a reference frame in a compressed format and the subsequent frames as the motion vectors and motion prediction residues of various pixel blocks from a prior frame. Tools, such as, transform coding and entropy coding, can be used to compress and/or store the first and subsequent frames. The volume of the compressed video data is smaller than the uncompressed video data, and therefore, reducing both the bandwidth used to transmit the video data and the storage space used to store the video data.

In one embodiment, the search continues when the minimal point is any one of the outer points. The search region is shifted such that the new search region is substantially centered on the minimal point found. For example, referring to FIG. 2, there are 8 possible moving directions, namely, four corner cases and four edge cases. The new search position is common for the two non-corner outer edge positions on each side of the rectangular search region. Some examples of new search regions are shown in FIG. 2, namely, the upper-left corner case 203, the right shift case 205, and the downward shift case 207.

In one embodiment, measurements of motion search points common to the two search patterns are reused to save time. Referring to FIG. 2, there are 4 common motion search points in the corner case 203, namely, motion search points 223. Therefore, measurements of the 12 non-common search points are performed in the shifted search pattern. In an edge case, such as the right shift case 205 or the downward shift case 207, there are 8 common search points. Therefore, measurements of the 8 non-common search points are performed in the shifted search pattern. In other words, 8 or more measurements are performed when the search pattern shifts by 2 grids.

In one embodiment, the 4×4 search region is further partitioned into 4 2×2 walk patterns, also known as tiles. Motion measurements may be performed in each 2×2 tile one by one.

Figure 3:
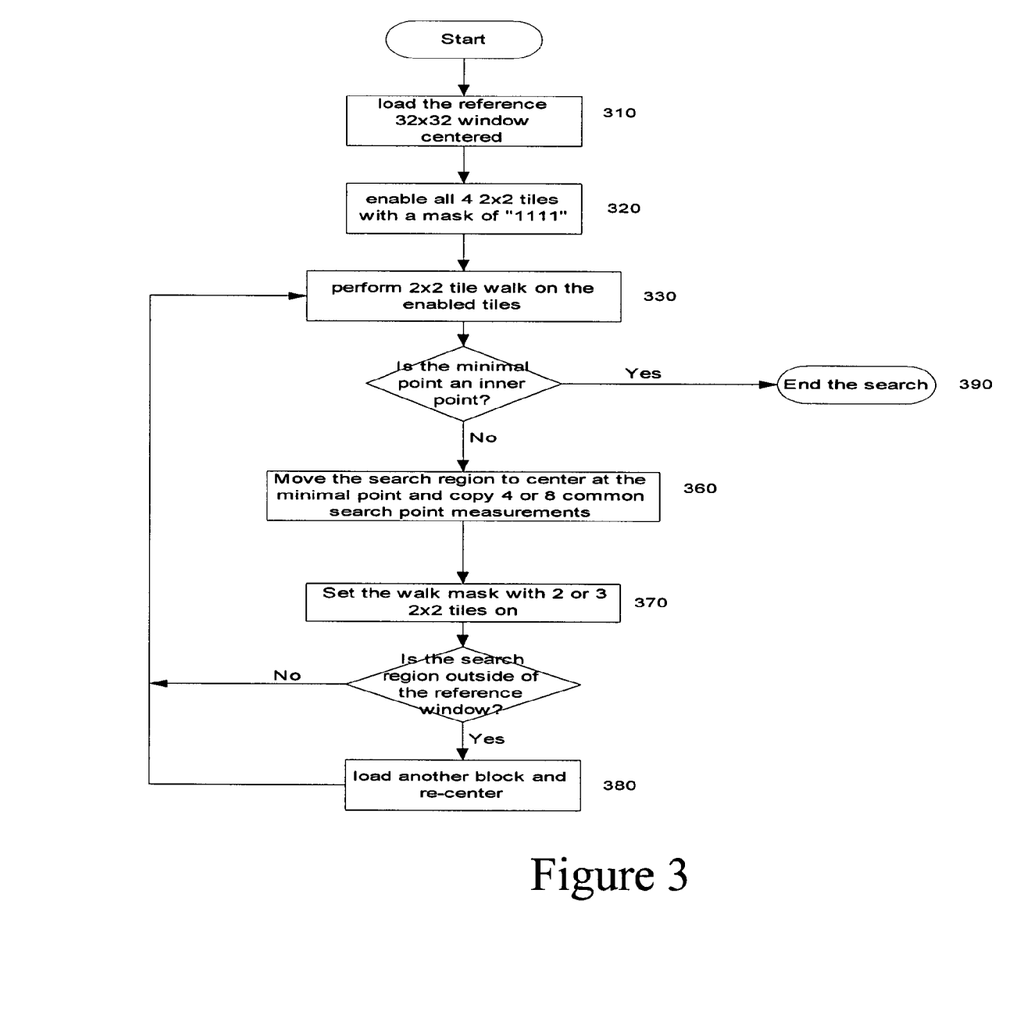
FIG. 3 shows a flow diagram of one embodiment of a process for performing a motion search with a rectangular search pattern.

FIG. 3 shows a flow diagram of one embodiment of a process for performing a motion search with a rectangular search pattern. The process is performed by processing logic that may comprise hardware (e.g., circuitry, dedicated logic, etc.), software (such as is run on a general purpose computer system or a dedicated machine), or a combination of both. Referring to FIG. 3, processing logic loads the reference window centered at a chosen starting search position in a reference video frame (processing block 310) for the pixel block in the current frame. In one embodiment, the reference window contains a 32×32 pixel array and the rectangular search region is a 4×4 square. In one embodiment, the 4×4 square search region is further divided into four 2×2 data units. The data unit may also be referred to as a tile. In one embodiment, processing logic sets a 4-bit mask to be "1111" to turn on motion measurement in each of the four tiles of the square search region, where each bit of the mask corresponds to a distinct tile in the square search region (processing block 320).

In one embodiment, processing logic performs motion measurement in each tile (processing block 330). Processing logic may complete motion measurement in one tile before moving onto another tile, which is also known as tile walking. In one embodiment, processing logic measures one or more attributes of a pixel at a search point in the search region. Examples of the attributes include pixel intensity, pixel color, etc. In one embodiment, processing logic computes the SAD of the attribute measured to find a point with the minimal SAD among the 16 motion search points (processing block 340). The point is also referred to as the minimal point.

In one embodiment, processing logic ends the search if the minimal point is one of the inner points in the search region (processing block 390). If the minimal point is one of the outer points of the search region, then processing logic shifts the square search region to be substantially centered on the minimal point (processing block 360). Since the current search region and the shifted search region overlap, it is unnecessary to measure the pixels at the motion search points in the overlapped area. In one embodiment, processing logic copies the SAD values of the 4 motion search points common to both search regions when the minimal point is at a corner of the current search region, or the SAD values of the 8 motion search points common to both search regions when the minimal point is along an edge of the current search region, but not at the corner of the current search region. In one embodiment, processing logic sets the mask with two 1's or three 1's to turn on motion measurement in 2 or 3 of the tiles in the shifted search region, depending on whether the minimal point is at a corner in the square search region (processing block 370).

In one embodiment, processing logic loads another block of pixels and re-centers the block if any of the pixels in the pixel blocks of the shifted search region are outside of the reference window (processing block 380). Processing logic then repeats processing blocks 330-380. In one embodiment, the motion search is performed to determine the relative movement of a pixel block from one video frame to another video frame. In one embodiment, processing logic compresses video data by saving the motion vectors representing the relative movement of the pixel blocks from one video frame to another video frame, rather than saving the entire video frame.

Figure 4:
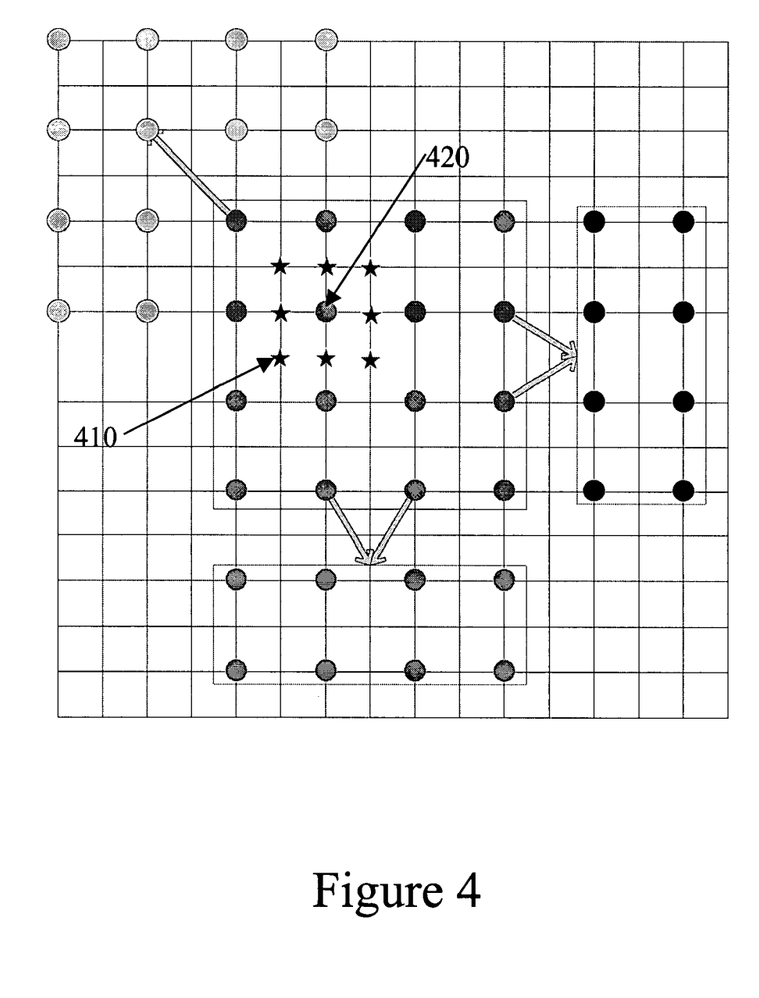
FIG. 4 shows one embodiment of a rectangular search pattern.

In one embodiment, a larger rectangular search pattern is used, such as, 8×8, 4×8, 16×4, etc. If the minimal point is not on the edge or at the corner of the rectangular search region, the search converges by shrinking the search region. In one embodiment, a sub-pixel motion vector is supported, and therefore, the search continues on the sub-pixel level when the minimal point of the integer motion search is one of the inner points of the search region. FIG. 4 shows one embodiment of a two-level hierarchical motion search with a rectangular search pattern. Referring to FIG. 4, the first level rectangular search pattern contains 4×4=16 search points with adjacent search points at 2-pixels apart. After the first level search, if the search is converged at an inner search point 420, the second level integer-point motion search is performed around point 420. In particular, the eight new sample positions 410 (marked as stars in FIG. 4) neighboring the minimal point 420 are measured at the second level search. The position with the minimal value among the 9 positions is the converged integer position. In one embodiment, a sub-pixel motion is at half-pixel resolution. The eight new sample positions at half-pixel positions neighboring the converged integer position in a shape similar to the shape formed by the eight sample positions 410 are measured. The position with the minimal value among the 9 positions (the 8 half-pixel positions plus the converged integer position) is the converged half-pixel position.

Figure 5:
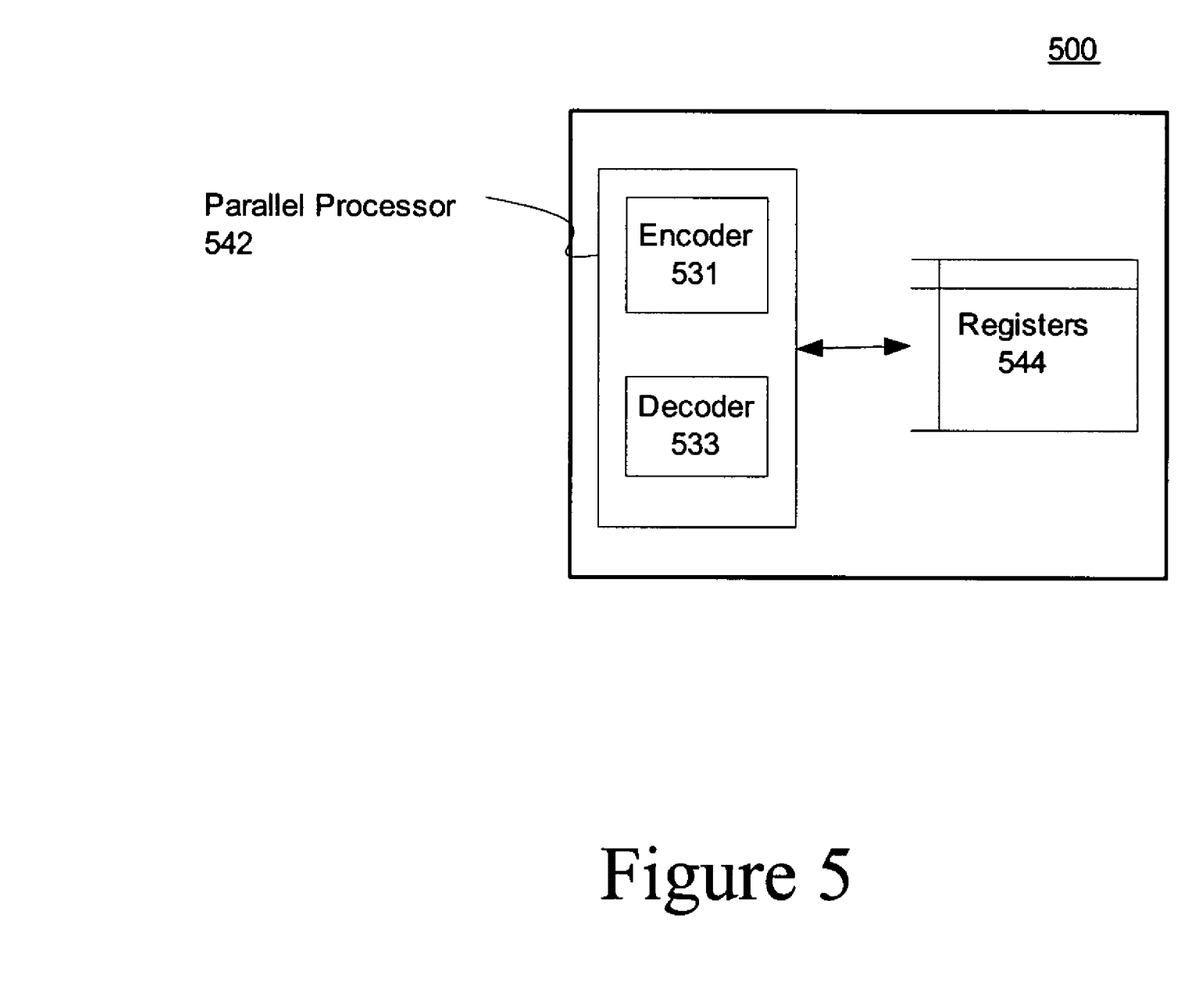
FIG. 5 shows one embodiment of a parallel processor chip.

FIG. 5 shows one embodiment of a parallel processor chip 500. The parallel processor chip 500 includes a parallel processor 542 and a set of registers 544. The set of registers are also referred to as the register file. The parallel processor 542 includes an encoder 531 and a decoder 533. Details of one embodiment of an encoder are discussed below with reference to FIG. 7. The parallel processor writes or reads data into or from the register file 544. In one embodiment, the data stored in the register file 544 is arranged in columns and rows.

In one embodiment, the parallel processor 542 adopts a single instruction multiple data (SIMD) architecture and supports column-based and row-based access of the register file 544. The parallel processor 542 loads the measurement data into the register file corresponding to the rectangular search region in the video frame. In one embodiment, the register file 544 is logically arranged in a rectangle, and therefore, the rectangular search region in the video frame can be conveniently mapped to a region in the register file. Storing pixel data in rectangular regions within the register file allows the parallel processor 542 to access and operate on the pixel data of search regions in parallel. Such parallel access capability increases the throughput of the parallel processor 542.

Figure 6:
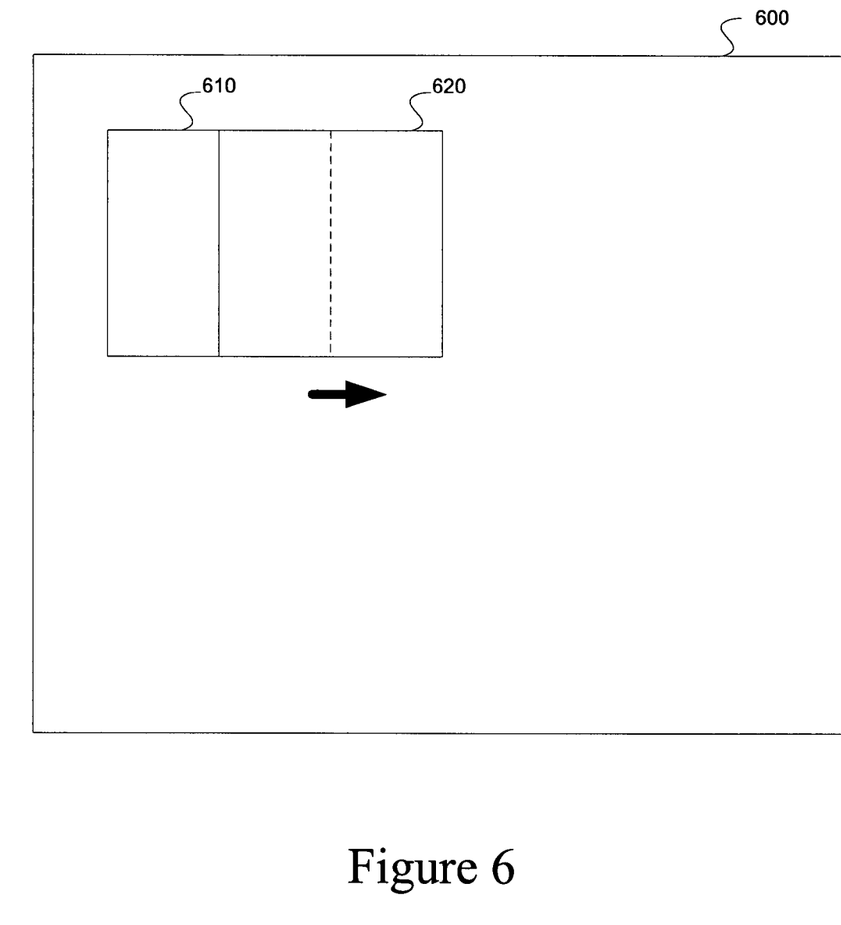
FIG. 6 shows an exemplary embodiment of a register file.

FIG. 6 shows an exemplary embodiment of a register file 600. The registers in the square 610 store the data of the search points of a square search region in a video frame. Suppose the minimal point of the search region is on the right edge of the square, a parallel processor shifts the square search region to the right. The data corresponding to the new search region is in the registers within square 620 in the register file 600. In one embodiment, the locations of the data in the register file correspond to the locations of the search points. Therefore, the parallel processor 542 reuses the data already stored in the register file in processing an overlapping search region to save time. Moreover, it is unnecessary to copy the data of the search points in the overlapping area to another location in the register file because the locations in which the data is stored correspond to the locations of the search points.

Furthermore, the use of a rectangular search pattern also makes reusing the data in the register file easier because the parallel processor can readily compute the address offsets for rectangular patterns in the register file, which may be logically arranged in a rectangle, unlike the diamond search pattern or the rhombus search pattern. In addition, the parallel processor 542 can reuse more data in the register file when the data is stored in rectangular regions corresponding to the search regions.

Figure 7:
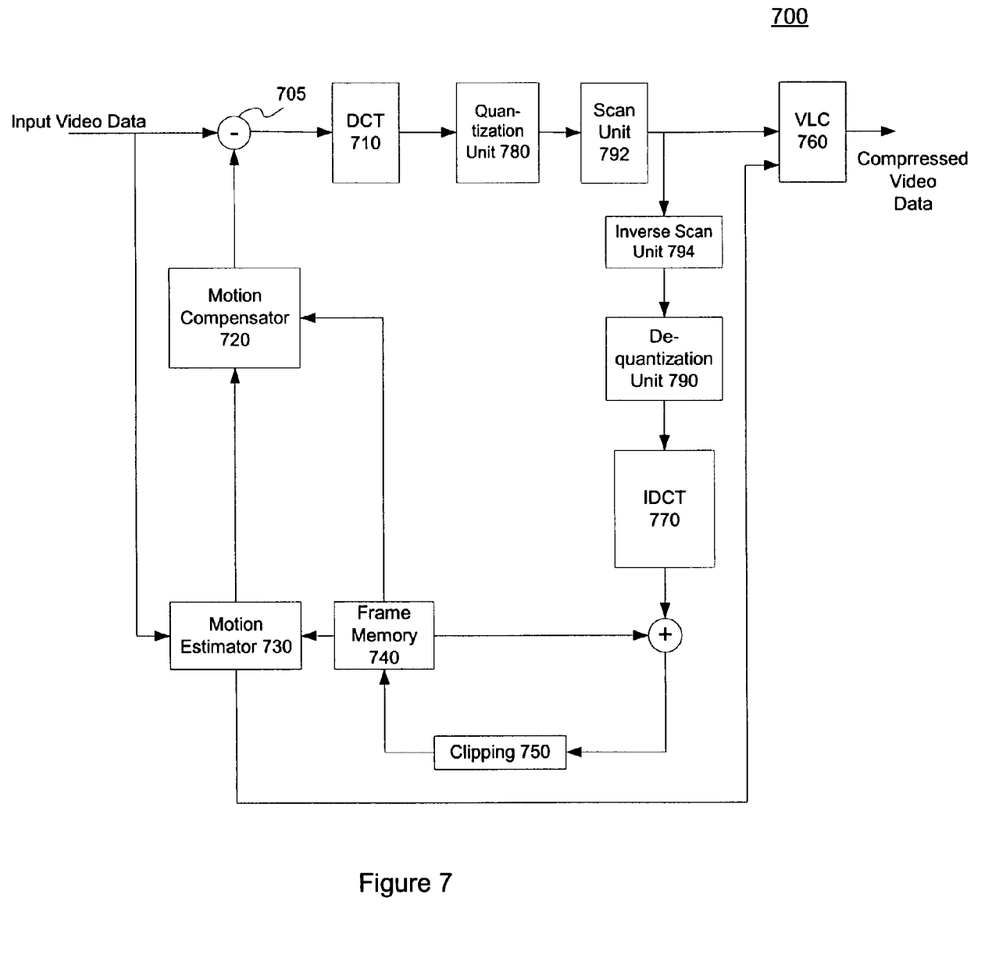
FIG. 7 shows one embodiment of a video encoder.

FIG. 7 shows one embodiment of a video encoder. The video encoder 700 may be an MPEG video encoder. The encoder 700 includes a discrete cosine transformer (DCT) 710, a motion compensator 720, a motion estimator 730, a frame memory 740, a logic circuitry to perform clipping 750, a variable length coder (VLC) 760, an inverse discrete cosine transformer (IDCT) 770, a quantization unit 780, a dequantization unit 790, a scan unit 792, and an inverse scan unit 794.

In one embodiment, input video data is provided to the motion estimator 730, which performs rectangular motion search to compare the current video frame with a reference video frame. The motion estimator may perform other types of motion search in addition to the rectangular motion search, such as, rhombus-shaped motion search. The output is provided to the VLC 760 as well as the motion compensator 720. The motion compensator also receives input from the frame memory 740 to determine motion compensation on the input data, which is subtracted from the current video frame by the subtractor 705. The compensated video data is input to the DCT 710. The DCT 710 outputs the transformed video data to a quantization unit 780. The quantization unit 780 outputs the quantized video data to a scan unit 792.

In one embodiment, the scan unit 792 organizes the data into a stream of data elements. For example, the scan unit 792 outputs a stream of data elements by zig-zag scanning a block of 8×8 quantized transformed video data. Since many of the data elements are zero after quantization, the data is formatted as a combination of two variables, namely, RUN and LEVEL. RUN is the number of zeros preceding the non-zero value at LEVEL. Therefore, the output of the quantization unit may consist of a sequence of (RUN, LEVEL) symbols. Moreover, the quantization unit may discard some information when the data compression is lossy, such as, MPEG-2 encoding. The scan unit 792 then outputs the quantized data to the VLC 760. In one embodiment, the quantized data is organized as a stream of data elements. In one embodiment, the VLC 760 passes each (RUN, LEVEL) pair through a set of Huffman lookup tables to be assigned a bit pattern. The bit patterns may have different numbers of bits for different (RUN, LEVEL) symbols, i.e., the bit patterns may have variable lengths.

Besides the VLC 760, the scan unit 792 also outputs data to an inverse scan unit 794. The inverse scan unit 794 reverses the stream of video data back to the block of 8×8 quantized transformed video data. The inverse scan unit 794 outputs data to a dequantization unit 790. The dequantization unit 790 reverses the quantization done on the data and outputs the data to the inverse DCT 770. The output of the inverse DCT 770 is added to the data from the frame memory 740. In one embodiment, the sum has more than eight bits, i.e., beyond the range of 0 to 255, and therefore, the sum is input to the logic circuitry to perform clipping 750. The logic circuitry 750 may truncate the input pixel by pixel to make the data to be within the range of 0 to 255. In one embodiment, any input value less than 0 is assigned to be zero, any input value greater than 255 is assigned to be 255, while any input value between 0 and 255 remains unchanged. The result of clipping is then stored in the frame memory 740. The result stored in the frame memory then may be used as the reference frame for future video frames.

Figure 8:
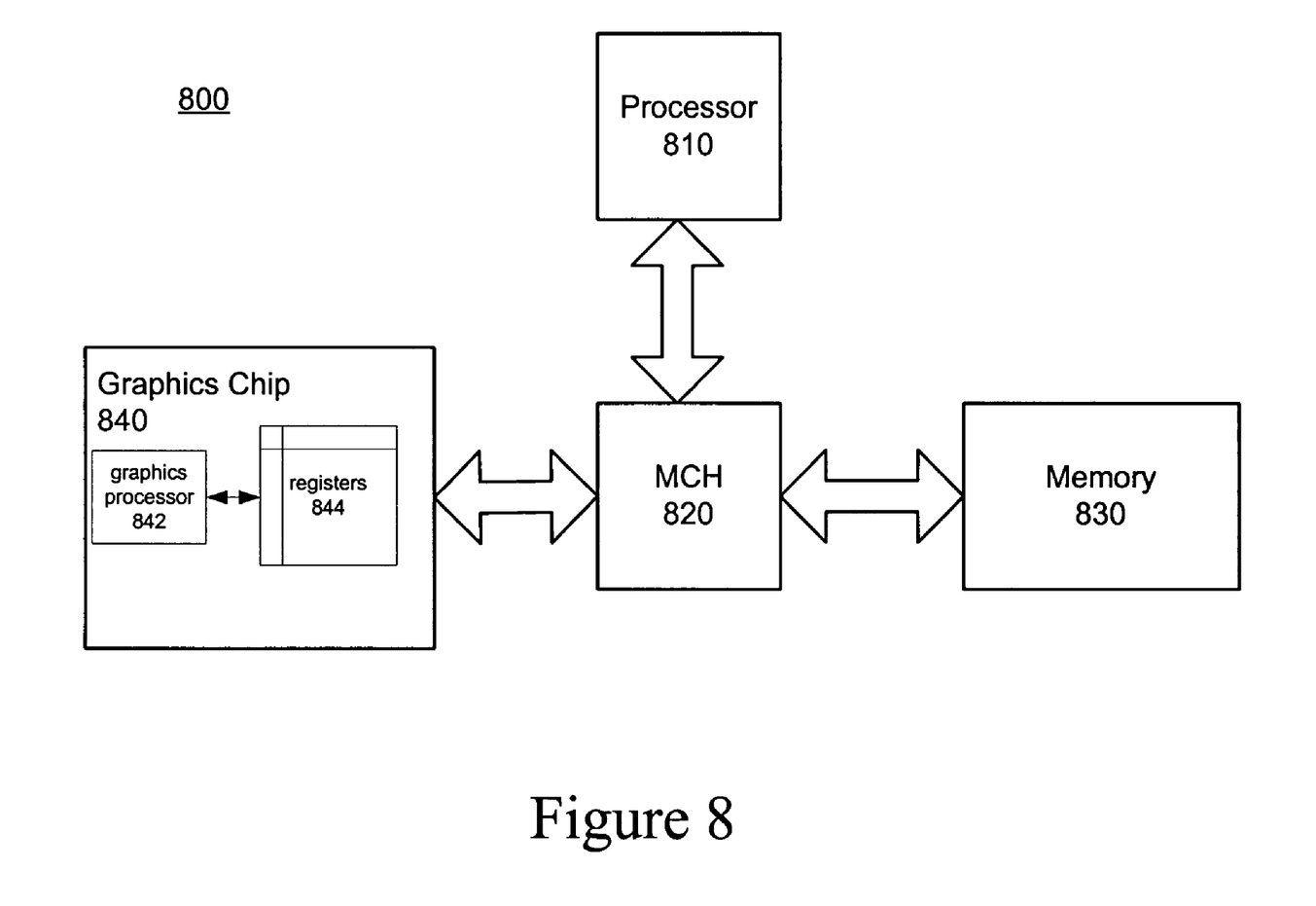
FIG. 8 shows an exemplary embodiment of a computer system.

FIG. 8 shows an exemplary embodiment of a computer system 800. The system 800 includes a processor 810, a dynamic random access memory (DRAM) 830, a memory controller (MCH) 820, and a graphics chip 840. The processor 810, the DRAM 830, and the graphics chip 840 are coupled to the MCH 820.

In one embodiment, the graphics processor 840 is a parallel processor capable of performing video encoding. The graphics chip 840 includes a set of registers 844 and a graphics processor 842. The set of registers 844 is referred to as a register file. In one embodiment, the register file is arranged in columns and rows. The graphics processor 842 is coupled to the set of registers 844.

In one embodiment, the graphics processor 842 performs a motion search in a video frame using a rectangular search pattern. There are a number of motion search points within the rectangular search pattern on a pixel block. The graphics processor 842 performs motion measurements on each of the motion search points to compute a SAD value for each of the motion search points. In one embodiment, the motion search point with the minimal SAD value is identified as the minimal point. If the minimal point is an outer point of the rectangular search region, the graphics processor 842 shifts the search region to be centered at the minimal point and repeats motion measurement on the motion search points within the shifted search region. Otherwise, the graphics processor 842 ends the search and computes the motion vector of the pixel block. The graphics processor 842 may store the measurement data, the SAD value, or the motion vector in the registers 844. By storing the motion search data of the video frame instead of the video frame itself, the graphics processor 842 compresses the video data.

The foregoing discussion merely describes some exemplary embodiments of the present invention. One skilled in the art will readily recognize from such discussion, the accompanying drawings and the claims that various modifications can be made without departing from the spirit and scope of the appended claims. The description is thus to be regarded as illustrative instead of limiting.

What is claimed is:

1. A method to determine relative movement of a pixel block from a first video frame to a second video frame, the method comprising:
    performing a motion measurement on a plurality of motion search points that form a rectangular search region, each of the plurality of motion search points corresponding to a pixel block;
    finding a minimal motion search point among the plurality of motion search points based on result of the motion measurement;
    performing a refinement motion search on a sub-pixel level if the minimal motion search point is within an inner region of the rectangular search region;
    finding a motion vector corresponding to the relative movement of the pixel block from the first video frame to the second video frame;
    repositioning the rectangular search region to be substantially centered on the minimal motion search point and partially overlapping a previous position of the rectangular search region while maintaining a size of the rectangular search region to be substantially the same if the minimal motion search point is along an edge or at a corner of the rectangular search region, the repositioned rectangular search region including a second plurality of motion search points; and
    performing a motion measurement on the second plurality of motion search points.

2. The method of claim 1, wherein the motion measurement on the second plurality of motion search points excludes the one or more of the plurality of motion search points falling within both the rectangular search region and the repositioned rectangular search region.

3. The method of claim 1, further comprising:
    dividing the rectangular search region into a plurality of data units, each of the plurality of data units having substantially the same size and a distinct subset of the plurality of motion search points, wherein the motion measurement is performed in each of the plurality of data units one by one.

4. The method of claim 3, wherein the rectangular search region is a square search region having 16 motion search points.

5. The method of claim 4, wherein the square search region is divided into 4 data units, each of the 4 data units has 4 distinct motion search points.

6. The method of claim 1, wherein performing the refinement motion search comprises shrinking the rectangular search region at the minimal point if the minimal motion search point is within the inner region of the rectangular search region.

7. The method of claim 1, further comprising performing a sub-pixel motion search around the minimal point if the minimal motion search point is within an inner region of the rectangular search region.

8. A method to compress video data comprising:
defining a first video frame as a reference video frame;
performing a motion search on a second video frame relative to the reference video frame to determine a plurality of motion vectors of the second video frame relative to the reference video frame; and
reducing the video data to the reference video frame and the plurality of motion vectors of the second video frame, wherein the motion search includes
performing motion measurement on a plurality of motion search points that form a rectangular search region each of the plurality of motion search points corresponding to a pixel block;
finding a minimal motion search point among the plurality of motion search points based on result of the motion measurement;
performing a refinement motion search on a sub-pixel level if the minimal motion search point is within an inner region of the rectangular search region;
finding a motion vector corresponding to the relative movement of the pixel block from the first video frame to the second video frame;
repositioning the rectangular search region to be substantially centered on the minimal motion search point and partially overlapping a previous position of the rectangular search region while maintaining a size of the rectangular search region to be substantially the same if the minimal motion search point is along an edge or at a corner of the rectangular search region, the repositioned rectangular search region including a second plurality of motion search points; and
performing a motion measurement on the second plurality of motion search points.

9. The method of claim 8, wherein the motion measurement on the second plurality of motion search points excludes the one or more of the plurality of motion search points falling within both the rectangular search region and the repositioned rectangular search region.

10. The method of claim 8, wherein performing the motion search further comprises:
dividing the rectangular search region into a plurality of data units, each of the plurality of data units having substantially the same size and a distinct subset of the plurality of motion search points, wherein the motion measurement is performed in each of the plurality of data units one by one.

11. A computer-readable medium encoded with a computer program having computer executable instructions for causing a processor to perform operations to determine relative movement of a pixel block from a first video frame to a second video frame, the operations comprising:
performing a motion measurement on a plurality of motion search points that forms a rectangular search region, each of the plurality of motion search points corresponding to a pixel block;
finding a minimal motion search point among the plurality of motion search points based on result of the motion measurement;
performing a refinement motion search on a sub-pixel level if the minimal motion search point is within an inner region of the rectangular search region;
finding a motion vector corresponding to the relative movement of the pixel block from the first video frame to the second video frame;
repositioning the rectangular search region to be substantially centered on the minimal motion search point and partially overlapping a previous position of the rectangular search region while maintaining a size of the rectangular search region to be substantially the same if the minimal motion search point is along an edge or at a corner of the rectangular search region, the repositioned rectangular search region including a second plurality of motion search points; and
performing a motion measurement on the second plurality of motion search points.

12. The computer-readable medium of claim 11, wherein the motion measurement on the second plurality of motion search points excludes the one or more of the plurality of motion search points falling within both the rectangular search region and the repositioned rectangular search region.

13. The computer-readable medium of claim 11, wherein the operations further comprise:
dividing the rectangular search region into a plurality of data units, each of the plurality of data units having substantially the same size and a distinct subset of the plurality of motion search points, wherein the motion measurement is performed in each of the plurality of data units one by one.

14. The computer-readable medium of claim 13, wherein the rectangular search region is a square search region having 16 motion search points.

15. The computer-readable medium of claim 14, wherein the square search region is divided into 4 data units, each of the 4 data units has 4 distinct motion search points.

16. A system comprising:
a dynamic random access memory (DRAM) device;
a memory controller coupled to the DRAM device; and
a parallel processor chip coupled to the memory controller, the parallel processor chip comprising
a plurality of registers defining a register file; and
a parallel processor coupled to the plurality of registers, wherein the parallel processor is operable to perform operations to determine relative movement of a pixel block from a first video frame to a second video frame, the operations comprising:
performing a motion measurement on a plurality of motion search points that form a rectangular search region, each of the plurality of motion search points corresponding to a pixel block;
finding a minimal motion search point among the plurality of motion search points based on result of the motion measurement;
performing a refinement motion search on a sub-pixel level if the minimal motion search point is within an inner region of the rectangular search region;
finding a motion vector corresponding to the relative movement of the pixel block from the first video frame to the second video frame;
repositioning the rectangular search region to be substantially centered on the minimal motion search point and partially overlapping a previous position of the rectangular search region while maintaining a size of the rectangular search region to be substantially the same if the minimal motion search point is along an edge or at a corner of the rectangular search region, the repositioned rectangular search region including a second plurality of motion search points; and performing a motion measurement on the second plurality of motion search points.

17. The system of claim 16, wherein the motion measurement on the second plurality of motion search points excludes the one or more of the plurality of motion search points falling within both the rectangular search region and the repositioned rectangular search region.

18. The system of claim 16, wherein the parallel processor loads a plurality of data elements into a rectangular region within the register file, the rectangular region corresponding to the rectangular search region.

19. The system of claim 16, further comprising a microprocessor coupled to the memory controller.

* * * * *